(12) United States Patent
Pfeiffer

(10) Patent No.: US 9,889,675 B2
(45) Date of Patent: Feb. 13, 2018

(54) METHOD FOR CORRECTION OF COLOR DEVIATIONS IN DIGITAL PRINTING MACHINES

(71) Applicant: HEIDELBERGER DRUCKMASCHINEN AG, Heidelberg (DE)

(72) Inventor: Nikolaus Pfeiffer, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/449,421

(22) Filed: Mar. 3, 2017

(65) Prior Publication Data

US 2017/0259581 A1 Sep. 14, 2017

(30) Foreign Application Priority Data

Mar. 11, 2016 (DE) .................... 10 2016 204 037

(51) Int. Cl.
*B41J 2/21* (2006.01)
*G03G 15/00* (2006.01)
(Continued)

(52) U.S. Cl.
CPC ........ *B41J 2/2132* (2013.01); *G03G 15/5062* (2013.01); *G06K 15/102* (2013.01); *H04N 1/40* (2013.01); *H04N 1/407* (2013.01)

(58) Field of Classification Search
CPC ......... B41J 2/2132; H04N 1/40; H04N 1/407; H04N 1/4078; G03G 15/5062; G03G 2215/0164; G06K 15/102
See application file for complete search history.

(56) References Cited

U.S. PATENT DOCUMENTS 5,633,662 A * 5/1997 Allen .................... B41J 2/2121
                                                              347/15
6,271,934 B1 * 8/2001 Hayashi ................. H04N 1/407
                                                                358/1.9
(Continued)

FOREIGN PATENT DOCUMENTS

DE           10241936 A1     4/2003
WO       2008127553 A1    10/2008

*Primary Examiner* — Anh T. N. Vo
(74) *Attorney, Agent, or Firm* — Laurence A. Greenberg; Werner H. Stemer; Ralph E. Locher

(57) ABSTRACT

A digital printing machine color control method includes printing test images onto substrates, measuring substrates using a measuring device, comparing actual color values on substrates and saved color setpoints of test images using a controller, calculating differences between color setpoints and actual color values on substrates using the controller, upon exceeding acceptable deviations between color setpoints and actual color values, modifying solid or halftone values by a factor using the controller, repeating printing test images using test image halftone values corrected by the factor and measuring new actual color values using the measuring device, comparing actual color values newly printed using corrected values and saved color setpoints of test images using the controller, calculating differences between newly printed actual color values and saved color setpoints of test images using the controller, and printing print jobs if differences between new actual color values and color setpoints are below acceptable deviations.

10 Claims, 1 Drawing Sheet

(51) Int. Cl.
*H04N 1/407* (2006.01)
*H04N 1/40* (2006.01)
*G06K 15/10* (2006.01)

(56) References Cited

U.S. PATENT DOCUMENTS

| | | | |
|---|---|---|---|
| 7,158,263 B2 * | 1/2007 | Allen | B41J 2/52 358/3.13 |
| 7,280,259 B2 * | 10/2007 | Sanger | H04N 1/40087 358/1.9 |
| 7,286,261 B2 | 10/2007 | Gudaitis et al. | |
| 7,599,634 B2 | 10/2009 | Kuo et al. | |
| 8,855,505 B2 * | 10/2014 | Yano | G03G 15/0189 399/15 |
| 2012/0050755 A1 | 3/2012 | Chandu et al. | |

* cited by examiner

METHOD FOR CORRECTION OF COLOR DEVIATIONS IN DIGITAL PRINTING MACHINES

CROSS-REFERENCE TO RELATED APPLICATION

This application claims the priority, under 35 U.S.C. § 119, of German Patent Application DE 10 2016 204 037.5, filed Mar. 11, 2016; the prior application is herewith incorporated by reference in its entirety.

BACKGROUND OF THE INVENTION

Field of the Invention

The present invention relates to a method for color control in a digital printing machine including a control unit and a color measuring device.

As is the case with lithographic offset printing presses, digital printing machines such as inkjet printing machines or printing machines relying on toner-based technology aim at reproducing the colors of an original, today mostly a digital original, as accurately as possible. A large number of techniques have been developed for that purpose. They ensure an accurate representation of the colors by implementing a color control process in the digital printing machine. A known technique is to take measurements on a printing substrate during the printing process by using a color measuring device, to calculate potential deviations and subsequently to minimize those deviations by carrying out control operations in the ink application system of the digital printing machine. Those control operations may be minimized or even eliminated if specific printing machine properties that result in color deviations are factored in from the beginning. In most cases, that process relies on so-called color profiles, which represent a kind of a finger print of the printing machine that reflects the characteristics of a machine in terms of color accuracy. A standardized color profile is the so-called ICC color profile. However, a correct representation of the colors does not only depend on the characteristics of the machine, but also on the characteristics of the ink in the printed substrate.

International Publication WO 2008/127553, corresponding to U.S. Pat. No. 7,599,634, discloses a digital printing machine and a method for operating a digital printing machine that are compatible with a plurality of printing substrates. The disclosed digital printing machine uses toner. The method involves the use of so-called substrate-specific ICC profiles instead of a single ICC profile. A problem with that approach is, however, that the large number of different printing substrates creates the logistic problem of administering all of the substrate-specific ICC profiles. Thus, the proposal is made instead to reduce the number of substrate-specific ICC profiles to a few universally applicable color profiles and to adapt the few universal ICC profiles to the physical properties of the printing substrate that is currently in use. The substrates are, in particular, categorized as one of the four basic categories of coated/uncoated and glossy/matte. In order to adapt those universal color profiles, the most important colors are printed onto the printing substrate in question and measurements are taken on a number of color measurement strips. That avoids time-consuming new measurements on hundreds or thousands of color measurement fields to generate a dedicated color profile. In that way, the negative effect that the adjustment/calibrating process may have on the productivity of the digital printing machine may minimized.

SUMMARY OF THE INVENTION

It is accordingly an object of the invention to provide a method for making corrections of color deviations in digital printing machines, in particular inkjet printing machines, which overcomes the hereinafore-mentioned disadvantages of the heretofore-known methods of this general type and which provides a quick and simple adaptation to a machine/substrate combination. If possible, the available ICC color profile is to be used.

With the foregoing and other objects in view there is provided, in accordance with the invention, a method for color control in a digital printing machine, which includes a number of steps. Initially, the digital printing machine prints a pre-defined color test image onto the printing substrate that is to be used in the next print job. Subsequently, inside or outside the printing press, a color measuring device is used to take measurements on the printing substrate that has received the test image. In a control unit of the digital printing machine, the actual color values that have been measured in this way are then compared to saved target color values or color setpoints pertaining to the test image. In this way, the control unit may calculate differences between the color setpoints and the actual color values measured on the printing substrate. The control unit then compares these differences with saved tolerances that represent acceptable deviations between color setpoints and actual color values. If these differences exceed the maximum acceptable deviations, the control unit makes halftone value corrections. In this process, at least one factor is assigned to the halftone values of the individual color separations on the computer to make color adaptations. In a following step, a test image is again printed onto the printing substrate, but this time using the halftone values after correction by the factor, and measurements are taken using the color measuring device. Then the measured actual color values that have been printed using the corrected halftone values are again compared to the saved color setpoints of the test image on the control unit and the differences between the newly printed actual color values and the saved color setpoints of the test image are calculated. If the differences between the new actual color values and the color setpoints are below the acceptable deviation, the colors have been represented in a sufficiently accurate way and the print job may be completed. In this way, color deviations may easily be compensated for by using a factor and applying it to the halftone values without requiring any complex recalibration of the printing machine or even the creation of a new ICC color profile. The color separations do not need to be re-screened. This provides quick and easy color correction for digital printing machines, in particular inkjet printing machines.

In a first embodiment of the invention, it is envisaged that the halftone values for every process color are multiplied by a color-specific factor on the control unit of the digital printing machine. This embodiment does not use one factor for all halftone values of all process colors but a color-specific factor for every process color. Thus, when color deviations occur, the different characteristics of the colors are factored in. Consequently, for every process color, a different factor per screened color separation is used and color control is improved. In digital printing, solid areas are often not represented by the maximum possible amount of ink but as halftone areas. Such areas are made up of dots of different drop sizes.

In addition, it is envisaged that all halftone values of the test image including the solid areas are multiplied by the at least one factor or by a color-specific factor for every process color on the control unit of the digital printing machine. Thus, the solid areas in a 100% screen are treated just like halftone values in the 50% or 0% range and a simple control operation in the form of a common factor per process color is provided.

In another embodiment of the invention, it is envisaged that a recalibration of the digital printing machine is carried out if the differences between the new actual color values that have been printed using the factor and the saved color setpoints continue to be outside the acceptable deviation range. In reality, it may happen that even when the present invention has been applied a number of times, i.e. after several prints, measurements on the test image, and adaptations of the color-specific factors, the differences between the actual color values and the color setpoints are outside the acceptable deviation range. In this case, the method of the invention is not sufficient and the digital printing machine needs to be recalibrated. This recalibration may either be done by the digital printing machine itself or by an operator.

In a further embodiment of the invention, it is envisaged that once the digital printing machine has been recalibrated, the test image is printed again, differences between the actual color values of the new print and saved color setpoints of the test image are calculated on the control unit of the printing machine and these differences are compared to additional deviations. This is a way to check whether the recalibration has managed to reduce the existing differences between the actual color values and the color setpoints in the test image to an acceptable level. If the acceptable deviations continue to be exceeded, the ICC profile of the digital printing machine may be automatically adapted. Even after an automated adaptation of the ICC profile of the digital printing machine it is envisaged that the test image will again be printed onto a printing substrate and that the control unit of the digital printing machine will again compare the actual color values of the further test image as measured by the color measuring device and the saved color setpoints of the test image and calculate differences. If differences that exceed the acceptable deviation range persist, the last step is to create a new ICC color profile. However, the creation of a new ICC color profile is complex and will always be a last resort.

A concomitant preferred aspect that is envisaged is that the digital printing machine is equipped with a display device and that information is shown on the display device when a recalibration of the printing machine, an adaption of the ICC profile, or the creation of a new ICC color profile are necessary. In this way, the operator of the printing machine is guided through every step of the proposed method and is shown the respective suitable step in the process. It is, in particular, envisaged that on the display device, the operator of the digital printing machine is guided through the process of recalibration, adaptation of the ICC color profile of the digital printing machine, or creation of a new ICC color profile of the digital printing machine. This considerably simplifies the implementation of the corresponding processes for an operator because graphic, visual, or audiovisual indicators guide through the individual steps of the processes, reducing the number of errors that may occur as the processes are implemented. In this way, color control operations of the digital printing machine may be made much easier for the operator and may become more reliable.

Other features which are considered as characteristic for the invention are set forth in the appended claims.

Although the invention is illustrated and described herein as embodied in a method for corrections of color deviations in digital printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
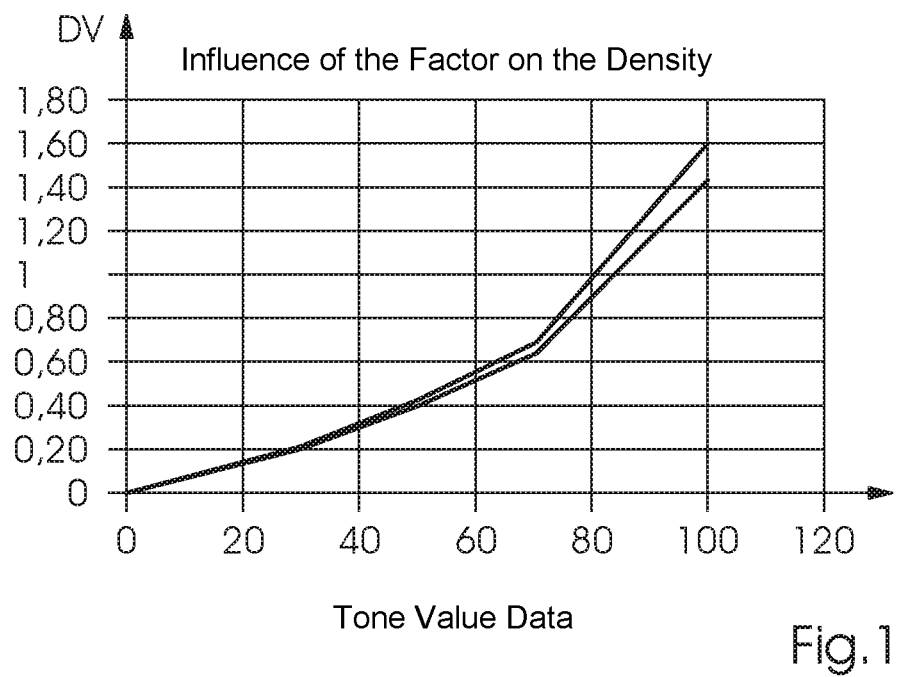
FIG. 1 is a diagram illustrating the influence of the factor on color density.

Referring now to the figures of the drawings in detail and first, particularly, to FIG. 1 thereof, there is seen an indication of tone value data of a process color in a halftone range between 0% and 100% on the X axis. The Y axis indicates color density values in DV. The upper curve represents the measured color density without the correcting factor whereas the lower curve represents the color density values corrected by a factor. In FIG. 1, a factor F=0.9 is used.

Figure 2:
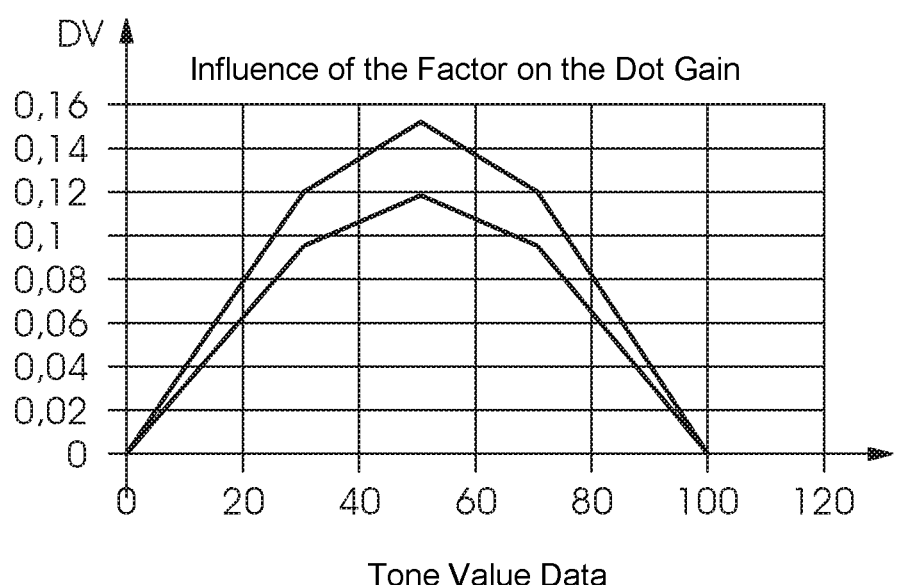
FIG. 2 is a diagram illustrating the influence of the factor on dot gain.

FIG. 2 again indicates the tone value data of the same process color in a halftone range of between 0% and 100% whereas the dot gain is indicated on the Y axis. The upper curve again indicates the tone values without the correction factor whereas the lower curve represents the tone values corrected by the factor. Again, the correcting factor is F=0.9. The figures show that for tone values in a range of 0% halftone and 100% halftone, the dot gain is low, whereas in the range of 50%, the dot gain is reduced to the greatest extent. In terms of color density, the influence of the correcting factor in the region of 0% halftone is likewise small, whereas the greatest influence is visible in the region of 100%. This shows that the use of the correcting factor has different influences on color density and dot gain. However, both FIGS. 1 and 2 show that the use of the correcting factor allows an influence on both dot gain and color density values in a comparatively wide range, allowing a quick color control to be implemented.

The invention claime is:
1. A method for color control in a digital printing machine having a control unit and a color measuring device, the method comprising the following steps:
   printing at least one test image onto a printing substrate in the digital printing machine;
   using the color measuring device to take measurements on the printing substrate;
   using the control unit to compare actual color values measured on the printing substrate and saved color setpoints belonging to the at least one test image;

using the control unit to calculate differences between the saved color setpoints and the actual color values measured on the printing substrate;

using the control unit to modify at least one of solid or halftone values by at least one factor, upon exceeding acceptable deviations between the saved color setpoints and the actual color values;

repeating the printing of the at least one test image using the test image halftone values having been corrected by the factor and using the color measuring device to measure new actual color values;

using the control unit to compare the actual color values having been newly printed using the corrected values and the saved color setpoints of the test image;

using the control unit to calculate differences between the newly printed actual color values and the saved color setpoints of the at least one test image; and using the digital printing machine to print a print job if the differences between the new actual color values and the saved color setpoints lie below the acceptable deviations.

2. The method according to claim 1, which further comprises using the control unit of the digital printing machine to multiply the halftone values for every process color by a color-specific factor.

3. The method according to claim 1, which further comprises using the control unit of the digital printing machine to multiply all halftone values of the at least one test image including the solid areas by the at least one factor or by a color-specific factor for every process color.

4. The method according to claim 1, which further comprises recalibrating the digital printing machine if the difference between the new actual color values having been printed using the factor and the saved color setpoints are outside of the acceptable deviation.

5. The method according to claim 4, which further comprises:

printing the at least one test image again once the recalibration of the digital printing machine has been completed;

using the control unit of the printing machine to calculate differences between the actual color values of the new print and the saved color setpoints of the at least one test image; and comparing the differences to acceptable deviations.

6. The method according to claim 5, which further comprises automatically adapting an ICC profile of the digital printing machine if the acceptable deviations are exceeded.

7. The method according to claim 6, which further comprises:

printing the at least one test image onto a printing substrate again after the automated adaptation of the ICC profile; and using the control unit of the digital printing machine to again compare the actual color values measured by the color measuring device on the further print and the saved color setpoints of the test image and to calculate differences.

8. The method according to claim 7, which further comprises creating a new ICC color profile for the digital printing machine if the differences between the further actual color values and the saved color setpoints of the test image exceed acceptable deviations.

9. The method according to claim 8, which further comprises displaying information on a display device of the digital printing machine when a recalibration of the printing machine, an adaptation of the ICC color profile, or the creation of a new ICC color profile is necessary.

10. The method according to claim 9, which further comprises using the display device to guide an operator of the digital printing machine through a process of recalibration, adaptation of the ICC color profile of the digital printing machine, or creation of a new ICC color profile of the digital printing machine.

* * * * *